US005516398A

United States Patent [19]

Goto

[11] Patent Number: 5,516,398

[45] Date of Patent: May 14, 1996

[54] EXCESSIVE LABEL PROJECTION PREVENTION DEVICE FOR LABELER

[75] Inventor: Fumio Goto, Iwate, Japan

[73] Assignee: Kabushiki Kaisha Sato, Japan

[21] Appl. No.: 358,020

[22] Filed: Dec. 16, 1994

Related U.S. Application Data

[63] Continuation-in-part of Ser. No. 133,624, Oct. 8, 1993, Pat. No. 5,403,431.

[30] Foreign Application Priority Data

| | | | |
|---|---|---|---|
| Oct. 8, 1992 | [JP] | Japan | 4-75906 |
| Mar. 10, 1994 | [JP] | Japan | 6-003378 U |

[51] Int. Cl.[6] ....... B32B 31/00

[52] U.S. Cl. ....... 156/540; 156/542; 156/579

[58] Field of Search ....... 156/540, 542, 156/523, 574, 577, 579

[56] References Cited

U.S. PATENT DOCUMENTS

| | | | |
|---|---|---|---|
| 3,436,294 | 4/1969 | Marano | 156/542 X |
| 3,907,626 | 9/1975 | Cook | 156/542 X |
| 4,737,223 | 4/1988 | Koch | 156/579 |
| 4,869,775 | 9/1989 | Quittner | 156/542 X |

*Primary Examiner*—James Engel
*Attorney, Agent, or Firm*—Ostrolenk, Faber, Gerb & Soffen

[57] ABSTRACT

An excessive label projection prevention device for a labeler having a main labeler unit and a label cassette. The excessive label projection prevention device includes a presser roller provided near a deflection pin of the label cassette and an excessive projection prevention member provided on the presser roller.

7 Claims, 5 Drawing Sheets

EXCESSIVE LABEL PROJECTION PREVENTION DEVICE FOR LABELER

This is a continuation-in-part of U.S. application Ser. No. 08/133,624, filed Oct. 8, 1993 now U.S. Pat. No. 5,403,431.

BACKGROUND OF THE INVENTION

1. Field of the Invention

This invention relates to a device for preventing excessive label projection in a labeler of the type used for manually affixing labels to objects.

2. Description of the Prior Art

Known manually operated labelers do not have a device for restricting the projection of labels that are peeled off a backing strip to which they are provisionally attached for attachment to objects to be labeled.

Japanese Utility Model Publication No. Sho 60(1985)-25374 of the present applicants discloses means for preventing the loosening of a label roll that has labels provisionally attached to a backing strip. These means prevent loosening of the label roll by bringing a resilient member into contact with the roll surface for restraining the inertial rotation of the roll.

When a user of a manual labeler of this type squeezes and releases an operating lever 9, which is provided opposite to the grip at the rear of the main labeler unit, a label is peeled off the label backing strip. So long as the operating lever is squeezed and released gently, no problems arise. However, when the operating lever is rapidly squeezed and released, the peeled-off label is projected more than necessary and therefore cannot be properly affixed to the object to be labeled.

SUMMARY OF THE INVENTION

An object of the present invention is to provide an excessive label projection prevention device having a presser roller provided in the vicinity of a deflection pin of a label cassette loadable into a labeler unit with at least one rubber ring or at least one label presser member fit on the presser roller.

The label cassette, which can be loaded into and removed from the labeler unit, has a spool for holding a roll of a continuous label strip having a number of labels that are provisionally attached at regular intervals to a backing strip.

The backing strip is turned back at a deflection pin provided in the label cassette. One or more claws, which reciprocate in the longitudinal direction of the labeler unit, convey the backing strip by engaging with traction holes provided therein. The provisionally attached labels are individually peeled off the backing strip at the deflection pin portion and the peeled-off labels are dispensed from the front end of the labeler unit one by one. The claws are reciprocated by squeezing and releasing an operating lever that is mechanically linked with the claws.

Although rapid operation of the operating lever tends to dispense the peeled-off labels further than required, the excessive projection prevention member, which is provided on the presser roller, restrains the amount that the label is dispensed by applying frictional resistance thereto.

Other features and advantages of the present invention will become apparent from the following description of the invention which refers to the accompanying drawings.

DETAILED DESCRIPTION OF THE INVENTION

Figure 1:
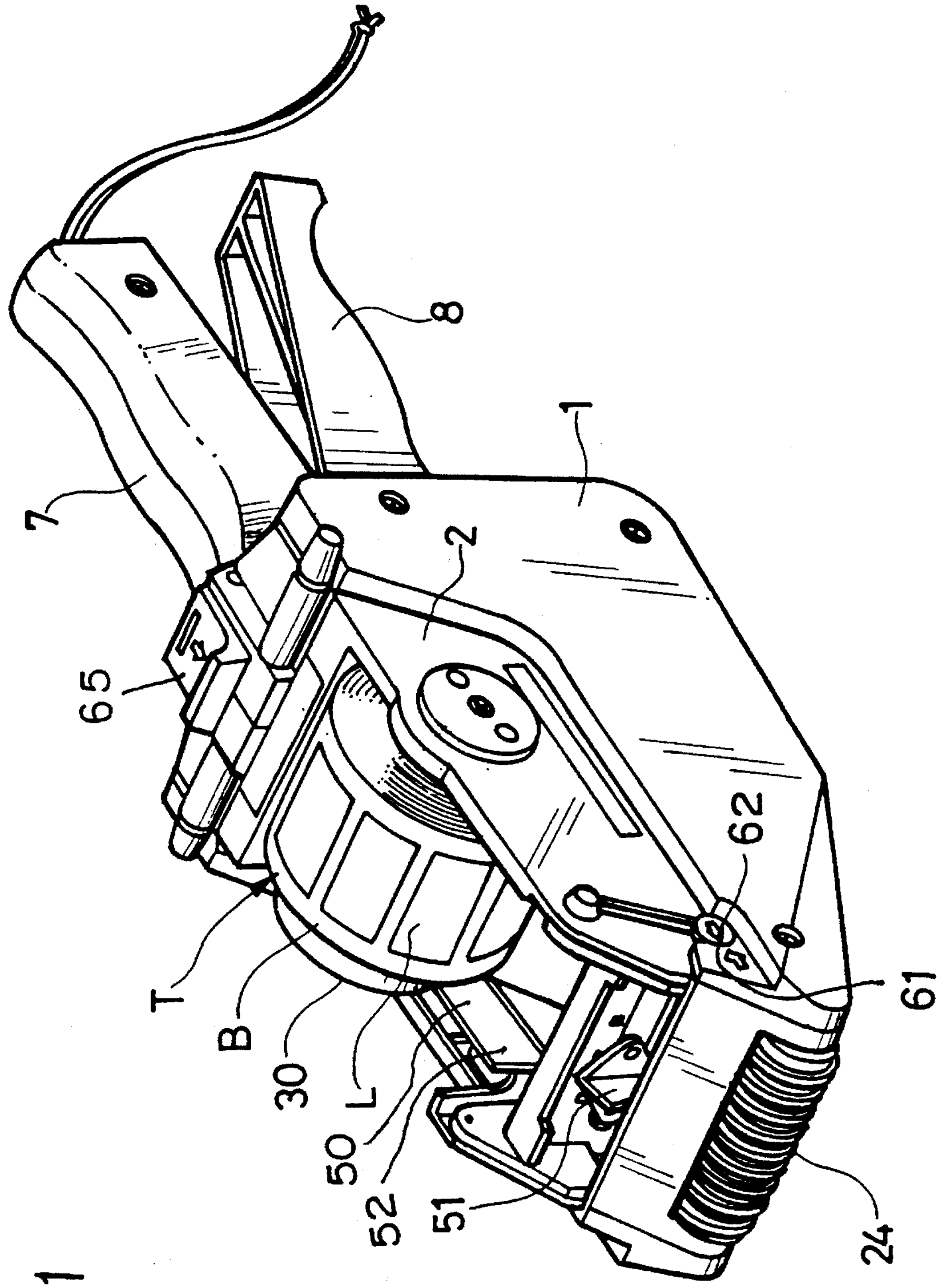
FIG. 1 is a perspective view of a labeler unit equipped with the excessive label projection prevention device according to this invention and loaded with a label cassette containing a roll of a continuous label strip.
Figure 2:
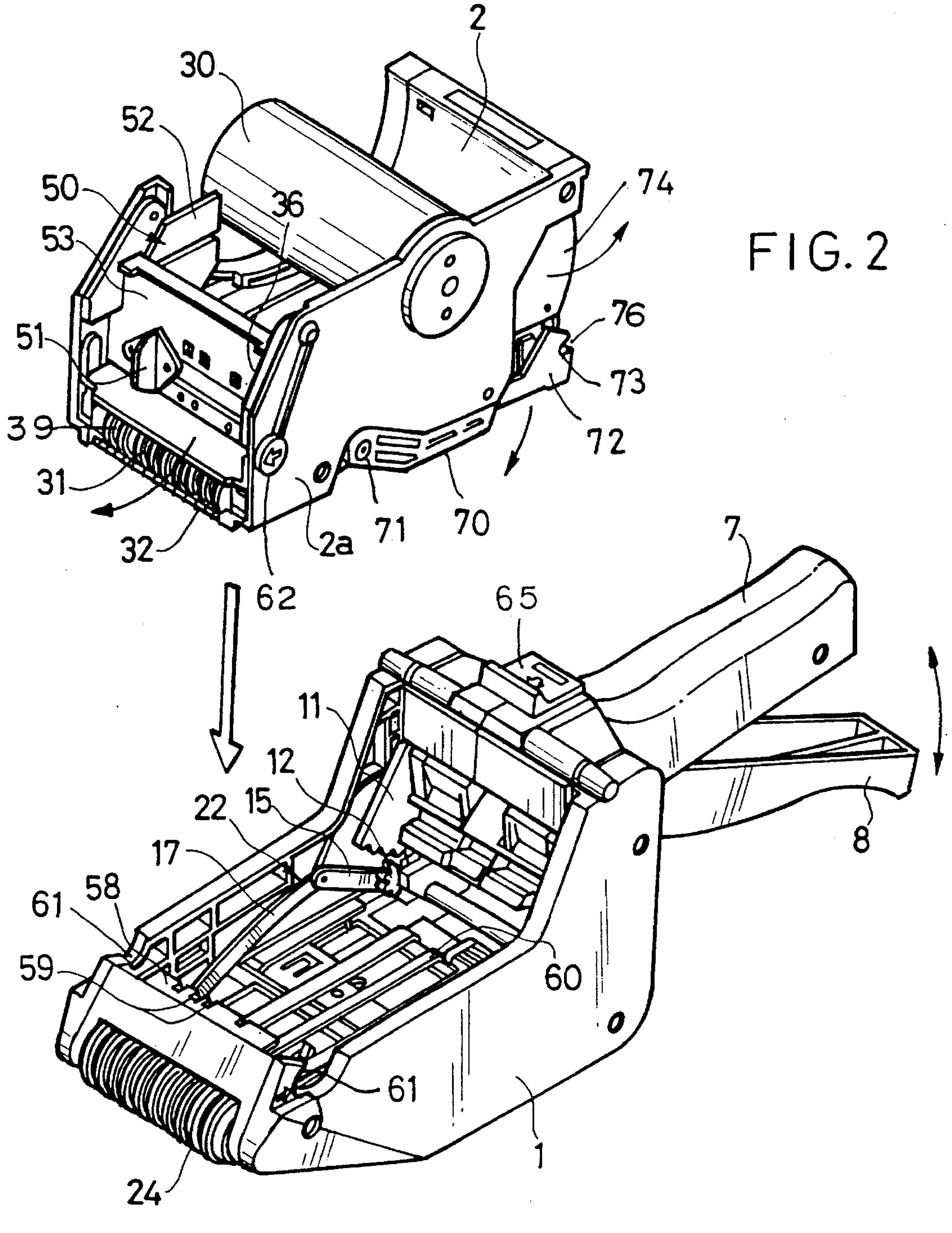
FIG. 2 is a perspective view of the labeler unit of FIG. 1 showing the labeler unit and the label cassette in their separated state.

FIGS. 1 and 2 show a labeler 10 including a labeler unit 1 and a label cassette 2 loaded into the labeler unit 1. The label cassette 2 has a spool 30 for holding a roll of a continuous label strip T having a number of preprinted labels $L_1$ that are provisionally attached at regular intervals to a backing strip B. When an operating lever 8 of the labeler unit 1 is squeezed in the direction of a grip 7 thereof, one of the labels $L_1$ is peeled off the backing strip B and prepared for attachment to the objects to be labeled.

The roll of the continuous label strip T is available in different:types, in which the labels $L_1$ that are provisionally attached to the backing strip B are of different lengths. When the continuous label strip T is changed from one type to another, a label feed pitch change-over mechanism of the labeler unit 1 is operated to change the label feed pitch to a setting that is suitable for the pitch of the labels of the new continuous label strip T.

Figure 3:
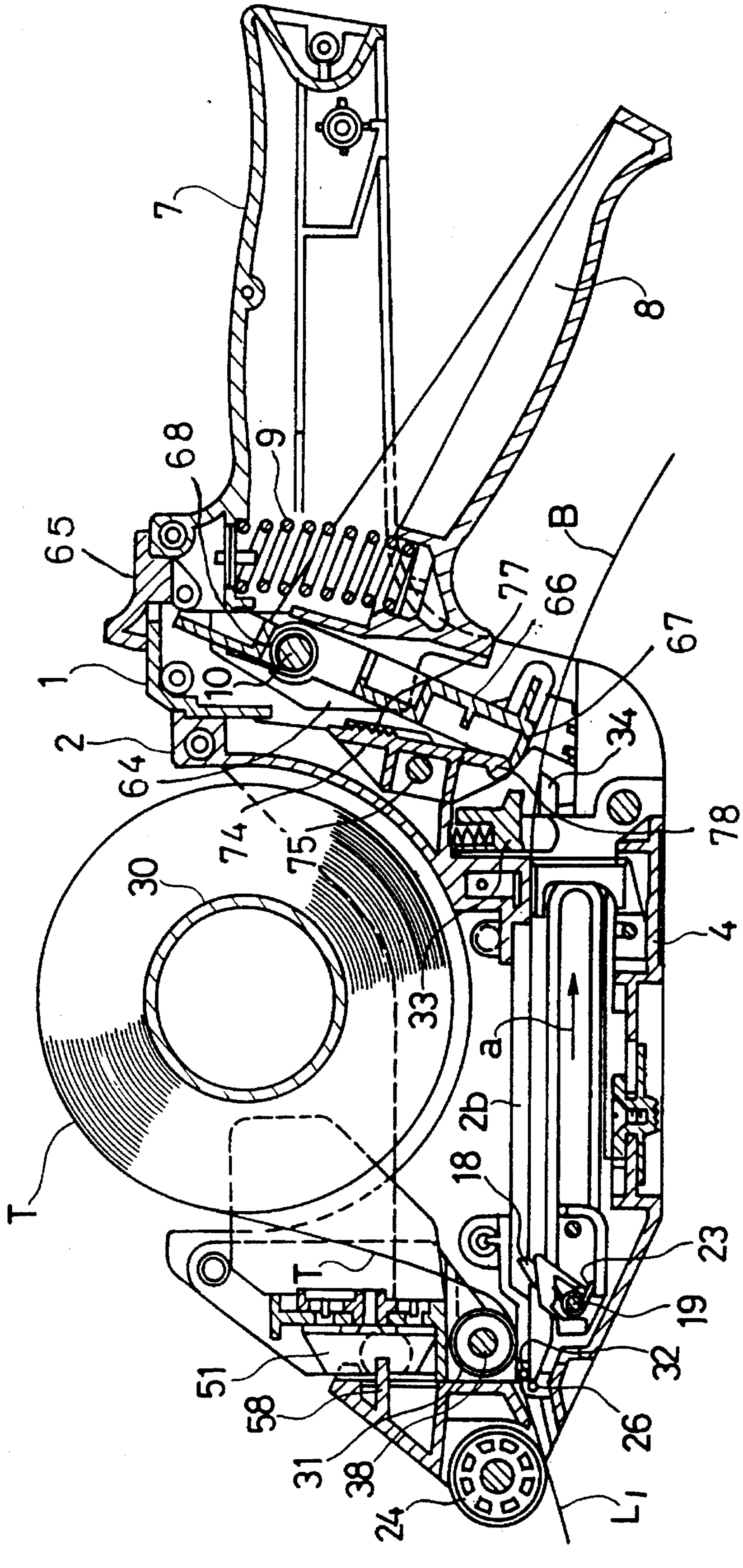
FIG. 3 is a side sectional view of the labeler unit of FIG. 1 with the label cassette loaded and the continuous label strip in place.

FIG. 3 shows a side sectional view of the labeler unit 1 loaded with a label cassette 2, which has a roll of the continuous label strip T on a spool 30.

The tip of the continuous label strip T is dispensed from the label cassette 2 and passes under a presser roller 31 to a deflection pin 32 provided in the label cassette 2, where the backing strip B is turned sharply back for peeling off the labels $L_1$. The backing strip B, from which the labels $L_1$ have been peeled off, is conveyed in the direction of the arrow a by claws 18. On the return stroke, the claws 18 disengage from the backing strip B and move in the opposite direction from the arrow a so as to resume their initial positions.

As best seen in FIG. 2, the reciprocal motion of the claws 18 is produced, via geared arms 11, sector gears 12 and a claw reciprocator 22, by squeezing the operating lever 8 toward the grip 7 against the force of a spring 9 and by releasing the operating lever 8 to allow the spring 9 to return it to its normal position.

As seen in FIG. 3, each claw 18 is further biased by a coil spring 23 wound about a shaft 19. Thus, after the claws 18 have engaged traction holes provided in the backing strip B, and conveyed the backing strip B a prescribed distance (the label feed pitch), the action of the coil springs 23 enables the claws 18 to disengage from the traction holes and, while maintaining a light pressure on the undersurface of the backing strip B, to return to their original positions for engagement with the next pair of traction holes.

In the labeler 10 the labels $L_1$ that are provisionally attached to the backing strip B are peeled off the backing strip B and prepared for attachment to objects to be labeled by sharply reversing the direction of travel of the backing strip B. The excessive label projection prevention device according to this invention prevents the peeled-off labels $L_1$ from being projected or dispensed further than a prescribed amount from a labeling roller 24 at a label discharge port of the labeler 10.

The excessive label projection prevention device shown in FIGS. 2 and 3 to 6 is an improvement on the presser roller 31, which is located at the forward end of the label cassette 2 (FIG. 3), for holding down the dispensed continuous label strip T.

Figure 4:
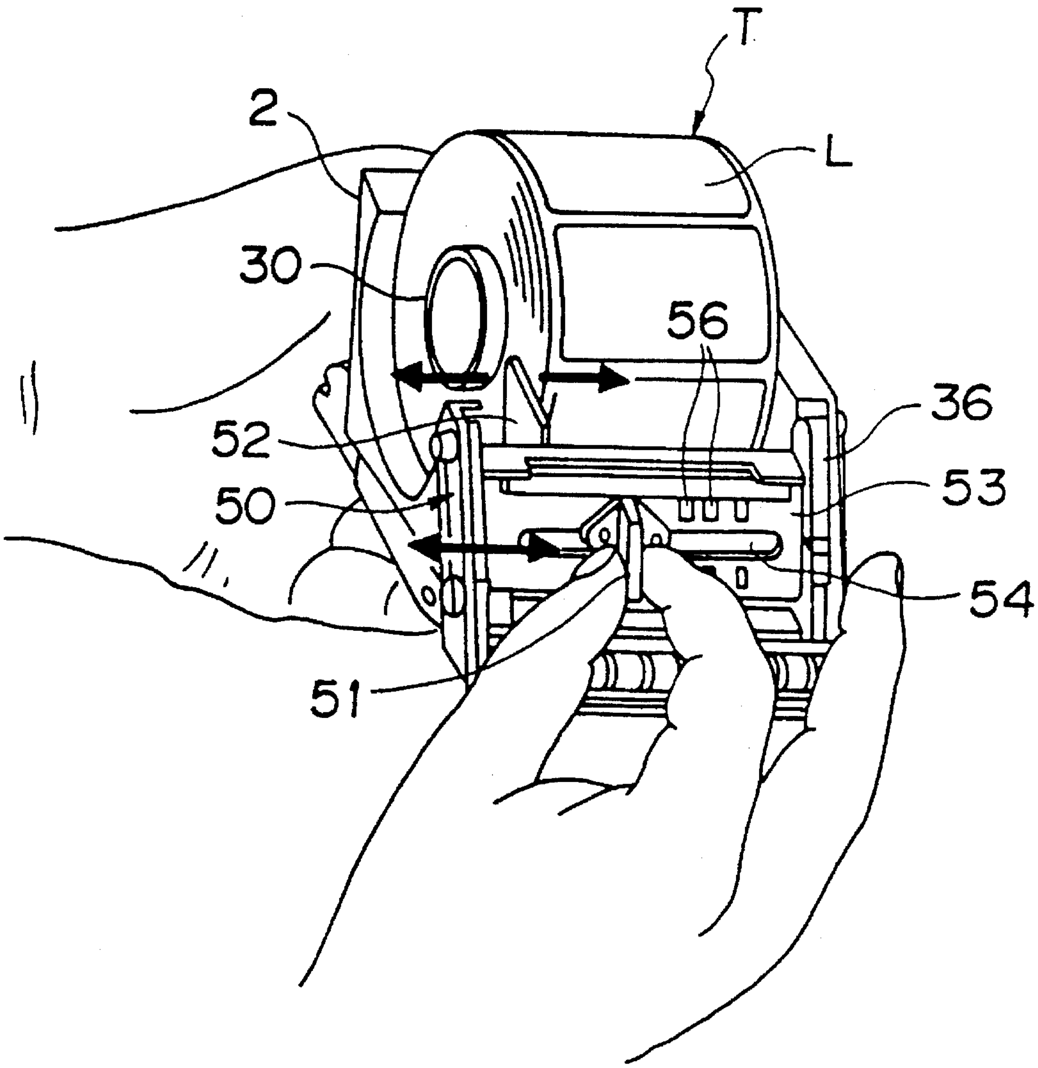
FIG. 4 is a front sectional view of a part of a first embodiment of an excessive label projection prevention device according to the invention.

Referring to FIG. 4, in a first embodiment of the present invention the label cassette 2 has a rotary label presser section 36 for holding down the continuous label strip T. The rotary label presser section 36 includes a pair of support projections 37, which are pivotally supported by the opposite side walls *2a*, *2a* of the label cassette 2 to retain the rotary label presser section 36 inside the label cassette 2.

More specifically, as shown in FIGS. 3 and 4, the leading end of the roll of the continuous label strip T is drawn out and, with the rotary label presser section 36 opened upward, turned back at the deflection pin 32 and set in a rotary backing sheet presser section at the rear of the label cassette 2.

The presser roller 31 for guiding the continuous label strip T is provided at the forward end of the rotary label presser section 36. The presser roller 31 is preferably divided into a plurality of sections so as to be able to cope with labels of different width and configuration. In the illustrated embodiment, the presser roller 31 is divided into two roller sections 31*a* and 31*b*.

The presser roller 31 is mounted on a roller shaft 38 and is provided on its periphery with a large number of peripheral projections 39 for smoothly guiding the continuous label strip T. A plurality of rubber rings 40*a* that serve as excessive label projection prevention members are fit over the presser roller 31 at positions between the peripheral projections 39.

The rubber rings 40a that are provided on the periphery of the presser roller 31 elastically retain the continuous label strip T as it passes through the narrow gap G between the presser roller 31 and the bottom *2b* of the label cassette 2. The peeled-off labels $L_1$ are thus prevented from projecting more than a prescribed amount.

Figure 5:
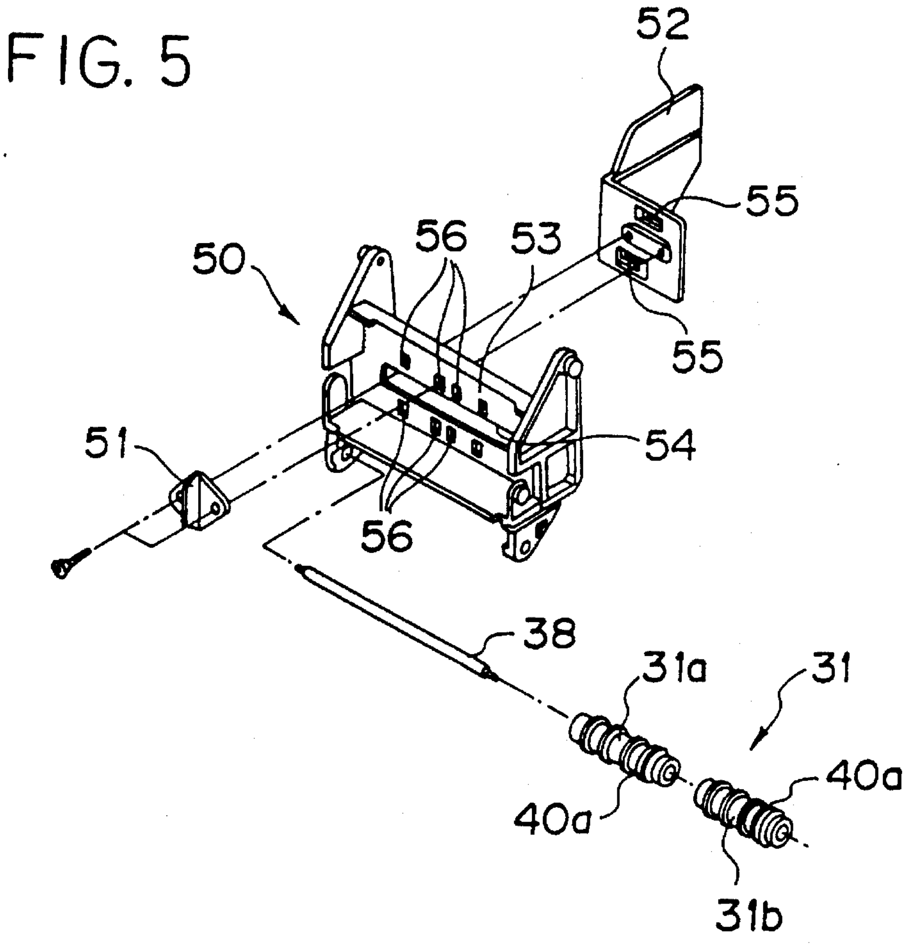
FIG. 5 is a side sectional view of a part of a second embodiment of an excessive label projection prevention device.
Figure 6:
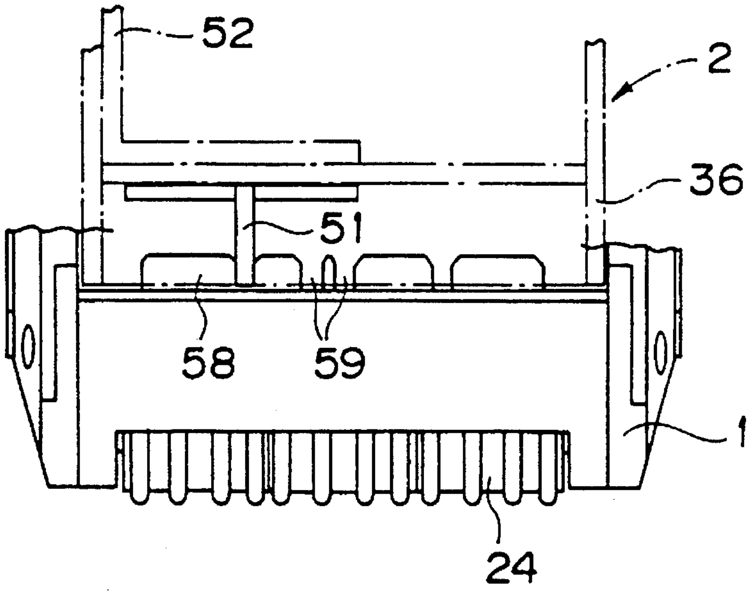
FIG. 6 is a sectional view of another part of the second embodiment.

Referring to FIGS. 5 and 6, in a second embodiment of the present invention, the roller shaft 38 at the forward end of the rotary label presser section 36 of the label cassette 2 is fit with a presser roller 31 having three roller sections 31*a*, 31*b*, 31*c*. Elastic label presser members 40*b* made of synthetic resin and formed integrally with the rotary label presser section 36 project between adjacent roller sections 31*a* and 31*b*, 31*b* and 31*c*.

The elastic label presser members 40*b* serve as excessive label projection prevention members by applying an elastic force on the deflection pin 32 located at the bottom front of the label cassette 2. This force prevents the labels $L_1$ that are peeled off the backing strip B and projected forward from being projected more than a prescribed amount.

The labeler unit 1 is provided with a label receiver 25 for receiving the peeled-off labels $L_1$, an auxiliary pin 26 for guiding the peeled off labels $L_1$, and the labeling roller 24 for affixing the labels to the individual objects to be labeled.

The operation of the excessive label projection prevention device according to the invention is now explained. A roll of the continuous label strip T is inserted onto the spool 30 of the label cassette 2, which is capable of being loaded into and removed from the labeler unit 1. The continuous label strip T has a backing strip B with a number of preprinted labels $L_1$ provisionally attached thereto at regular intervals.

The backing strip B is turned back at the deflection pin 32 provided in the label cassette 2. The claws 18, which are adapted to reciprocate in the longitudinal direction of the labeler unit, are engaged with traction holes (not shown) of the backing strip B for conveying the backing strip B.

The provisionally attached labels are peeled off the backing strip at the deflection pin 32 and the peeled-off labels $L_1$ are dispensed from the front end of the labeler unit 1. The reciprocation of the claws 18 is produced by squeezing and releasing the operating lever 8, which is mechanically linked with the claws 18.

Although rapid operation of the operating lever tends to dispense the peeled-off label further than required, the excessive projection prevention member (40*a*, 40*b*) that is provided on the presser roller 31 restrains the amount the label is dispensed by applying frictional resistance thereto.

In the excessive label projection prevention device according to this invention, the presser roller 31 is provided in the label cassette 2, which is loadable into the labeler unit 1, at a portion of the label cassette 2 in the vicinity of the deflection pin 32 for turning back the backing strip B to peel off the labels $L_1$. The presser roller 31 is provided with the excessive label projection prevention member (rubber rings 40*a*, elastic label presser members 40*b*). As a result, a frictional force is applied to the peeled-off labels $L_1$ as they are dispensed, thus preventing them from being projected further than required.

Since excessive and rapid projection of the peeled-off labels is prevented, the labels can be affixed to the objects to be labeled in good condition.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An excessive label projection prevention device for a labeler, the labeler including a main labeler unit and a label cassette adapted to be loaded into and removed from the main labeler unit, the cassette having a label discharge for discharge of the labels therethrough, a deflection pin at the label discharge of the label cassette for peeling labels off a backing strip;

the main labeler unit having a label application roller past the label discharge for receiving labels from the label discharge and for affixing peeled-off labels to objects, the excessive label projection prevention device comprising:

a presser roller provided near and just before the deflection pin of the label cassette on the path of the labels toward the label discharge and a plurality of excessive projection prevention friction rings provided on the presser roller for engaging the labels moving to the discharge.

2. The excessive label projection prevention device according to claim 1, wherein the rings are rubber rings.

3. A labeler comprising:

a main body;

a label cassette for holding a roll of labels, the label roll comprising a strip of separable labels and a backing strip to which the strip of labels is separately adhered; the cassette being adapted to be loaded into add removed from the main body;

label strip advancing means on the main body for engaging the backing strip and for drawing the label strip off the label roll;

reversing means in the labeler cassette for sharply turning the backing strip in a reverse direction and for there separating the labels from the backing strip as the labels do not reverse direction along with the backing strip;

an outlet from the cassette to the main body for the separated labels separated at the reversing means; label application means on the main body for applying labels received from the cassette to another object;

a label strip presser roller in the cassette and located just before the reversing means for engaging the label strip on the path of the label strip to the reversing means;

a surface in the main body toward which the presser roller presses as the presser roller rotates, and means guiding the label strip between the surface and the presser roller for the presser roller to press on the label strip;

a plurality of label strip engaging and friction applying rings arrayed spaced along the presser roller for engaging the label strip for preventing excessive projection of the labels as the label strip is advanced by advancing of the backing strip.

4. The labeler of claim 3, wherein the surface engaged by the rings on the presser roller is below the presser roller.

5. The labeler of claim 3, wherein the rings are comprised of rubber.

6. The labeler of claim 3, wherein the rings are comprised of synthetic resin.

7. The labeler of claim 3, wherein the surface engaged by the ring is at the reversing means just before the backing strip direction is reversed.

* * * * *